United States Patent
Sugaya

(10) Patent No.: US 10,460,258 B2
(45) Date of Patent: Oct. 29, 2019

(54) COMPUTER SYSTEM, AND METHOD AND PROGRAM FOR CONTROLLING EDGE DEVICE

(71) Applicant: OPTiM Corporation, Saga-shi (JP)

(72) Inventor: Shunji Sugaya, Tokyo (JP)

(73) Assignee: OPTIM CORPORATION, Saga-Shi (JP)

( * ) Notice: Subject to any disclaimer, the term of this patent is extended or adjusted under 35 U.S.C. 154(b) by 0 days.

(21) Appl. No.: 15/568,852

(22) PCT Filed: Nov. 30, 2016

(86) PCT No.: PCT/JP2016/085565
§ 371 (c)(1),
(2) Date: Oct. 24, 2017

(87) PCT Pub. No.: WO2018/100678
PCT Pub. Date: Jun. 7, 2018

(65) Prior Publication Data
US 2018/0293513 A1    Oct. 11, 2018

(51) Int. Cl.
*G06N 20/00* (2019.01)
*H04L 29/08* (2006.01)
*H04L 12/66* (2006.01)

(52) U.S. Cl.
CPC ............ *G06N 20/00* (2019.01); *H04L 67/125* (2013.01); *H04L 12/66* (2013.01)

(58) Field of Classification Search
None
See application file for complete search history.

(56) References Cited

U.S. PATENT DOCUMENTS

2002/0052908 A1    5/2002    Cho et al.
2013/0262891 A1*  10/2013    Gudlavenkatasiva ......................
                                             G06F 1/3212
                                                 713/320

(Continued)

FOREIGN PATENT DOCUMENTS

JP    2002-140194    5/2002
JP    2014-222480    11/2014
JP    2007-241718    9/2017

OTHER PUBLICATIONS

Requirement for implementing Io T, http://www.meti.go.jp/committee/sankoushin/shojo/johokeizai/bunsan_senryaku_wg/pdf/001_04_00.pdf & its English Translation, p. 6-9, NTT, Mar. 28, 2016.

*Primary Examiner* — Alan Chen
(74) *Attorney, Agent, or Firm* — Lex IP Meister, PLLC

(57) ABSTRACT

The present invention is to provide a computer system and a method and a program for controlling an edge device that acquire data for a predetermined machine learning from a combination of sensors in a network, perform possible learning with the sensors without the user's intention, and output the result. According to the present invention, a computer system that performs machine learning with an edge device 100 connected with a gateway 200 detects an edge device 100 connected with the gateway 200, determines the combination of the detected edge devices 100, determines a program for an edge device 100 and a program for machine learning based on the determined combination, and causes the edge devices 100 to execute the program for an edge device 100 and causes a predetermined computer to execute the program for machine learning.

9 Claims, 12 Drawing Sheets

(56) References Cited

U.S. PATENT DOCUMENTS

| | | | |
|---|---|---|---|
| 2015/0289107 A1* | 10/2015 | Aksamit | H04W 4/025 |
| | | | 455/456.1 |
| 2016/0095013 A1* | 3/2016 | Faivishevsky | G08C 25/00 |
| | | | 370/252 |
| 2016/0299899 A1 | 10/2016 | Logachev | |
| 2017/0180214 A1* | 6/2017 | Azevedo | H04L 41/147 |
| 2018/0188704 A1* | 7/2018 | Cella | H04Q 9/00 |
| 2018/0288161 A1* | 10/2018 | Saxena | H04L 67/22 |

* cited by examiner

COMBINATION DB

| TYPE NAME | DEVICE NAME |
|---|---|
| Type 1 | TOT-SE01 (Temperature sensor for tomatoes)<br>CAM01 (Camera)<br>PH06 (Smart phone) |
| Type 2 | BB-01 (Sensor kit for plastic greenhouse)<br>WEBCAM25 (Camera)<br>GAL (Tablet) |
| ⋮ | ⋮ |

FIG. 9

PROGRAM DB

| TYPE NAME | DATA SET FOR MACHINE LEARNING |
|---|---|
| Type 1 | Application for tomato cultivation<br><br>Program set F for edge device<br><br>Machine learning program B for computer |
| Type 2 | Application for cucumber cultivation<br><br>Program set V for edge device<br><br>Machine learning program D for computer |
| ⋮ | ⋮ |

FIG. 10

COMPUTER SYSTEM, AND METHOD AND PROGRAM FOR CONTROLLING EDGE DEVICE

TECHNICAL FIELD

The present invention relates to a computer system and a method and a program for controlling an edge device that perform machine learning with an edge device connected with a gateway.

BACKGROUND ART

In recent years, the technique called "edge AI (artificial intelligence) computing" has been known. In such a technique, machine learning is performed by using an edge device connected with a gateway.

As such a system that performs machine learning, the composition in which for example, edge computers are arranged near edges (various sensors) in a conventional public line network to perform necessary processes to increase the processing speed so that the other computers connected with the public line network can perform the processes that take a time, such as image analysis and machine learning is disclosed (refer to Non-Patent Document 1).

CITATION LIST

Non-Patent Literature

Non-Patent Document 1
http://www.meti.go.jp/committee/sankoushin/shojo/johokeizai/bunsan_sen ryaku_wg/pdf/001_04_00.pdf

SUMMARY OF INVENTION

However, in the composition of Non-Patent Document 1, a system architect or a user should specify data to be learnt in the machine learning.

An objective of the present invention is to provide a computer system and a method and a program for controlling an edge device that acquire data (teacher data) for a predetermined machine learning from a combination of sensors in a network, perform possible learning with the sensors without the user's intention, and output the result.

The present invention provides a computer system that performs machine learning with an edge device connected with a gateway, including:

a detection unit that detects an edge device connected with the gateway;

a combination determination unit that determines the combination of the detected edge devices;

a program determination unit that determines a program for an edge device and a program for machine learning based on the determined combination; and an execution unit that causes the edge devices to execute the program for an edge device and causes a predetermined computer to execute the program for machine learning.

According to the present invention, a computer system that performs machine learning with an edge device connected with a gateway detects an edge device connected with the gateway, determines the combination of the detected edge devices, determines a program for an edge device and a program for machine learning based on the determined combination, and causes the edge devices to execute the program for an edge device and causes a predetermined computer to execute the program for machine learning.

The present invention is the category of a computer system, but the categories of a method, a program, etc., for controlling an edge device have similar functions and effects.

The present invention can provide a computer system and a method and a program for controlling an edge device that acquire data for a predetermined machine learning from a combination of sensors in a network, perform possible learning with the sensors without the user's intention, and output the result.

BRIEF DESCRIPTION OF DRAWINGS

FIG. 9 shows one example of the combination database.

FIG. 10 shows one example of the program database.

DESCRIPTION OF EMBODIMENTS

Embodiments of the present invention will be described below with reference to the attached drawings. However, these are illustrative only, and the technological scope of the present invention is not limited thereto.

Overview of System for Controlling an Edge Device 1

Figure 1:
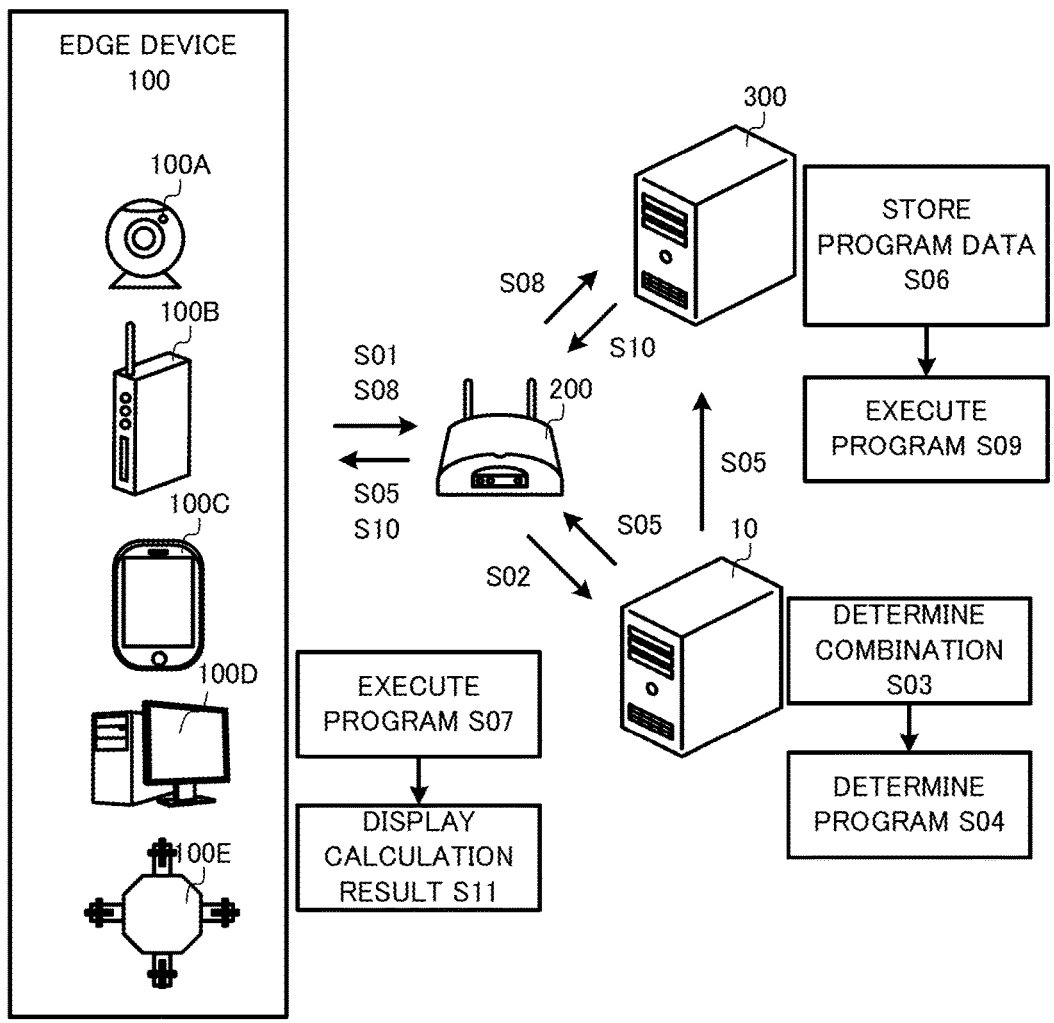
FIG. 1 shows a schematic diagram of the system for controlling an edge device 100.

A preferable embodiment of the present invention will be described below with reference to FIG. 1. FIG. 1 shows an overview of the system for controlling an edge device 1 according to a preferable embodiment of the present invention. The system for controlling an edge device 1 includes a suggestion computer 10, an edge device 100 (e.g., a network camera 100a, a sensor device 100b, a mobile terminal 100c, a computer device 100d, a drone 100e), a gateway 200, and a computer 300, which performs machine learning with the edge device 200 connected with the gateway 100.

In FIG. 1, the numbers of the suggestion computers 10, the edge devices 100, the gateways 200, and the computers 300 can be appropriately changed. The type of the edge device 100 can also be appropriately changed. Furthermore, the suggestion computer 10, the edge device 100, the gateway 200, and the computer 300 are not be limited to actual devices and may be virtual devices. The processes to be described later may be achieved by any one of or in combination of any two or more of the suggestion computer 10, the edge device 100, the gateway 200, and the computer 300.

The suggestion computer 10 is a computer device data-communicatively connected with the gateway 200 and the computer 300.

The edge device 100 is a terminal device data-communicatively connected with the gateway 200. Examples of the edge device 100 include a network camera 100a that takes an image such as a still or a moving image, a sensor device 100b that acquires environmental data such as spatial data and temporal data including sunlight, temperature, and wind power, a mobile terminal 100c and a personal computer 100d that are electrical appliances such as a mobile phone, a mobile information terminal, a tablet terminal, a personal computer, a net book terminal, a slate terminal, an electronic book terminal, and a portable music player, and a drone 100e such as an uninhabited airborne vehicle or an uninhabited moving vehicle.

The gateway 200 is a network device that is capable of data communication with the suggestion computer 10, the edge device 100, and the computer 300. Examples of the gateway 200 include a router and a computer device that are connectable with LAN (Local Area Network) and WAN (Wide Area Network).

The computer 300 is a computer device that is capable of data communication with the suggestion computer 10 and the gateway 200.

First, the gateway 200 detects an edge device 100 connected with the gateway 200 itself (Step S01). The gateway 200 detects a network camera 100a, a sensor device 100b, a mobile terminal 100c, a computer device 100d, and a drone 100e that are connected through LAN.

The gateway 200 transmits data on the detected edge device 100 to the suggestion computer 10 (Step S02).

The suggestion computer 10 receives the data on the edge device 100. The suggestion computer 10 determines a combination of edge devices 100 based on the received data (Step S03). The suggestion computer 10 determines the combination of the edge devices 100 connected with the gateway 200 from the combinations of edge devices 100 that are previously stored as combination types, based on the received data The suggestion computer 10 determines a program for an edge device 100 and a program for machine learning based on the determined combination (Step S04).

The suggestion computer 10 transmits a program data for a device as the program for an edge device 100 to the gateway 200, and the gateway 200 forwards the program data to the edge device 100 corresponding to the received program for an edge device 100. The suggestion computer 10 also transmits a program data for learning as the program for machine learning to the computer 300 (Step S05).

The computer 300 receives the program data for learning, and the edge device 100 receives the program data for a device.

The computer 300 stores the program data for learning (Step S06).

The edge device 100 executes the program for an edge device 100 based on the program data for a device (Step S07). For example, the edge device 100 takes an image and acquires environmental data based on the program data for a device.

The edge device 100 transmits the device result data that indicates the execution result of the program data for an edge device 100 to the gateway 200, and the gateway 200 forwards the device result data to the computer 300 (Step S08).

The computer 300 receives the device result data. The computer 300 executes the program data for learning based on the device result data to execute the program for machine learning (Step S09).

The computer 300 transmits the calculation result data that indicates the execution result of the program for machine learning to the gateway 200, and the gateway 200 forwards the calculation result data to the edge device 100 that is a terminal device such as a mobile terminal 100c or a personal computer 100d (Step S10).

The edge device 100 receives the calculation result data. The edge device 100 displays the calculation result based on the calculation result data (Step S11).

Configuration of System for Controlling an Edge Device 1

Figure 2:
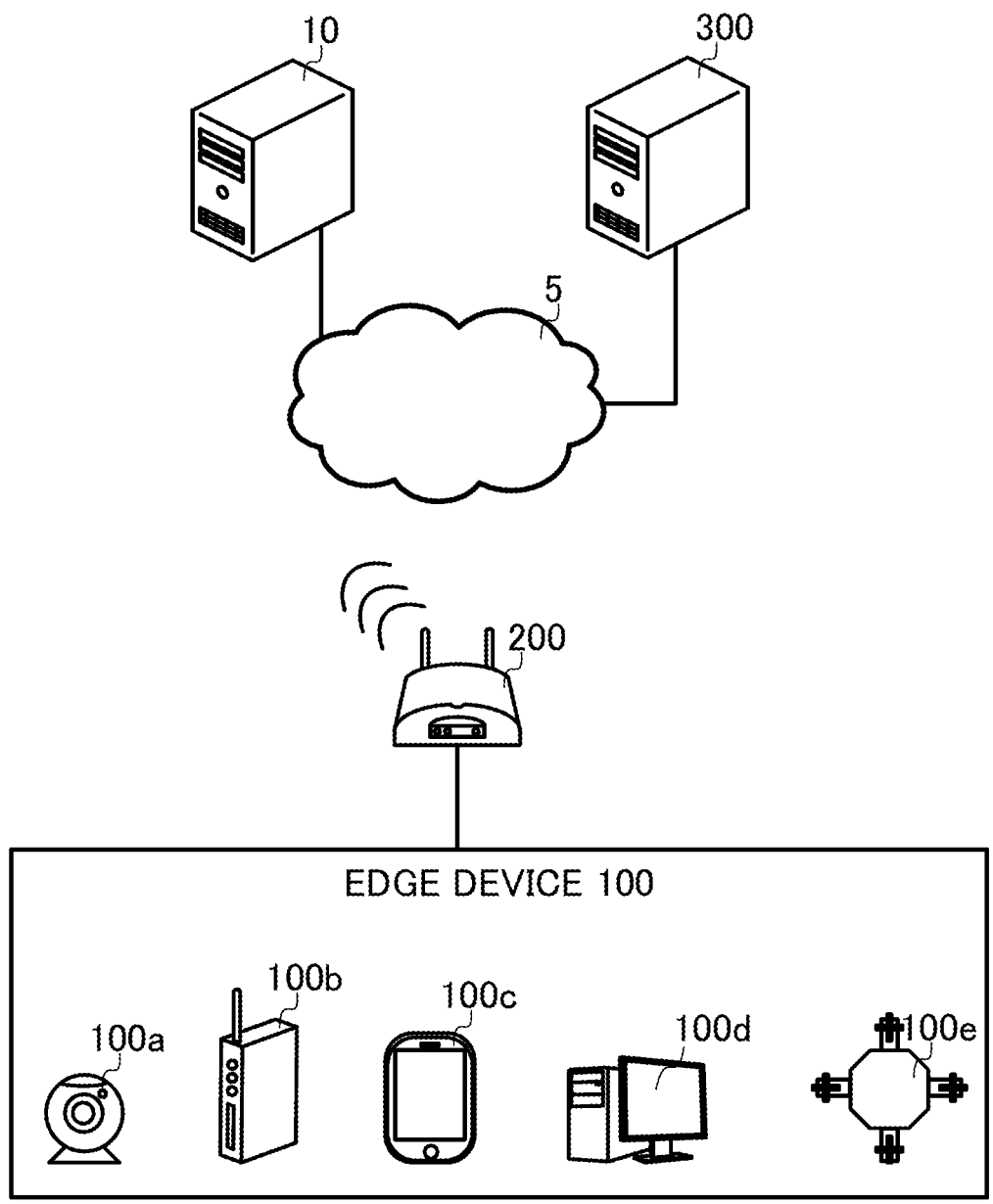
FIG. 2 shows an overall configuration diagram of the system for controlling an edge device 100.

A system configuration of the system for controlling an edge device 1 according to a preferable embodiment will be described below with reference to FIG. 2. FIG. 2 shows a system configuration of the system for controlling an edge device 1 according to a preferable embodiment of the present invention. The system for controlling an edge device 1 includes a suggestion computer 10, an edge device 100 (e.g., a network camera 100a, a sensor device 100b, a mobile terminal 100c, a personal computer 100d, a drone 100e), a gateway 200, a computer 300, a public line network (e.g., the Internet network, the third and the fourth generation communication networks), which performs machine learning with the edge device 100 connected with the gateway 200.

The number and the type of devices that compose the system for controlling an edge device 1 can be appropriately changed. The system for controlling an edge device 1 may not include actual devices and may be achieved with virtual devices. The processes to be described later may be achieved by any one of or in combination of any two or more of the devices that compose the system for controlling an edge device 1.

The suggestion computer 10 is the above-mentioned computer device with the functions to be described later.

The edge device 100 is the above-mentioned terminal device with the functions to be described later.

The gateway 200 is the above-mentioned network device with the functions to be described later.

The computer 300 is the above-mentioned computer device with the functions to be described later.

Functions

Figure 3:
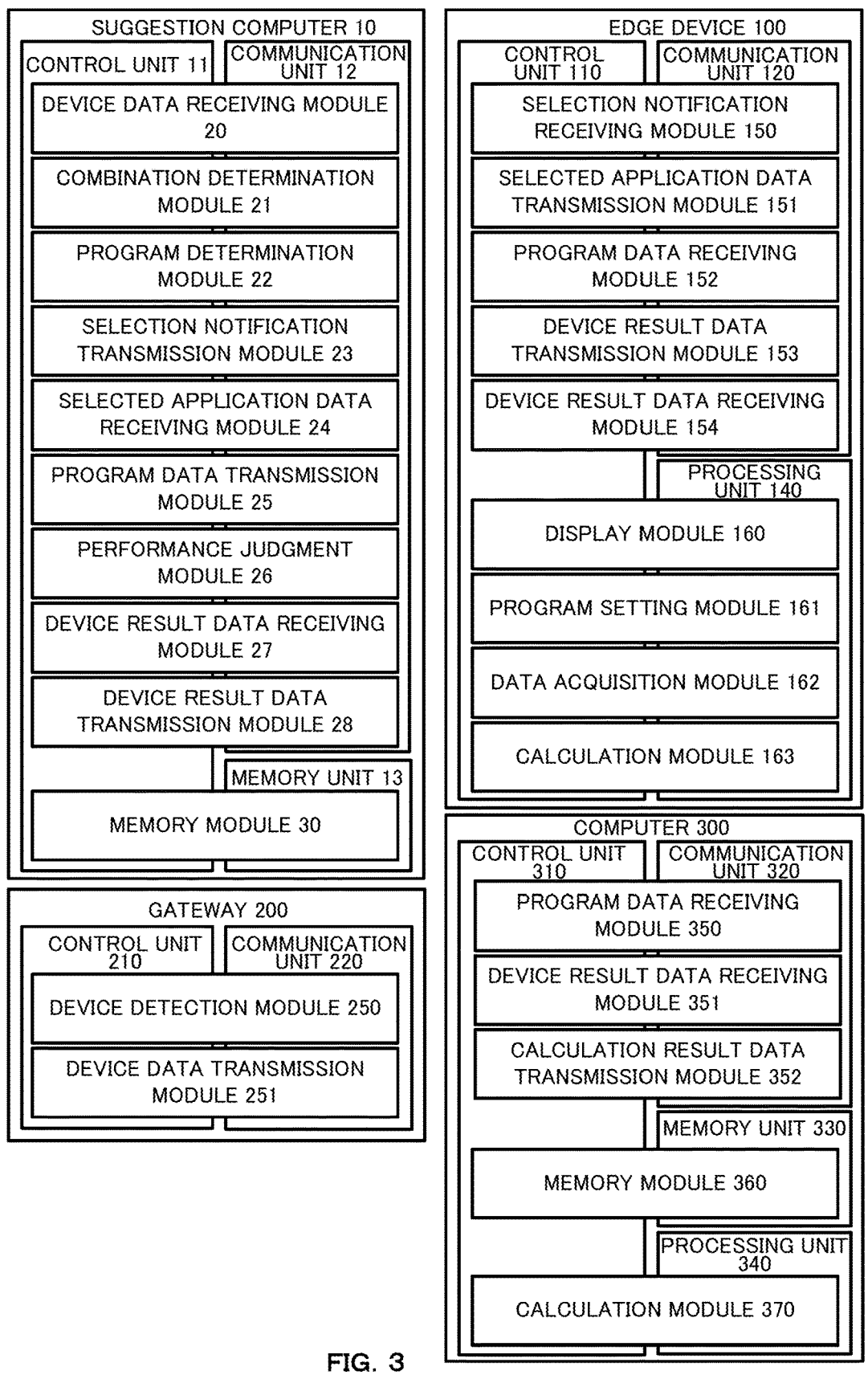
FIG. 3 shows a functional block diagram of the suggestion computer 10, the edge device 100, and the gateway 200.

Functions of the system for controlling an edge device 1 according to a preferable embodiment will be described below with reference to FIG. 3. FIG. 3 shows a functional block diagram of the suggestion computer 10, the edge device 100, the gateway 200, and the computer 300.

The suggestion computer 10 includes a control unit 11 provided with a central processing unit (hereinafter referred to as "CPU"), a random access memory (hereinafter referred to as "RAM"), and a read only memory (hereinafter referred to as "ROM"); and a communication unit 12 such as a device that is capable to communicate with other devices, for example, a Wireless Fidelity or Wi-Fi® enabled device complying with IEEE 802.11. The suggestion computer 10 also includes a memory unit 13 such as a hard disk, a semiconductor memory, a record medium, or a memory card to store data.

In the suggestion computer 10, the control unit 11 reads a predetermined program to achieve a device data receiving module 20, a combination determination module 21, a program determination module 22, a selection notification transmission module 23, a selected application data receiving module 24, a program data transmission module 25, a performance judgment module 26, a device result data receiving module 27, and a device result data transmission module 28, in cooperation with the communication unit 12. Furthermore, in the suggestion computer 10, the control unit 11 reads a predetermined program to achieve a memory module 30 in cooperation with the memory unit 13.

The edge device 100 includes a control unit 110 including a CPU, a RAM, and a ROM; and a communication unit 120 such as a device that is capable to communicate with other devices, in the same way as the suggestion computer 10. The edge device 100 also includes a processing unit 140 provided with various devices to acquire environmental data, image data, etc.

In the edge device 100, the control unit 110 reads a predetermined program to achieve a selection notification receiving module 150, a selected application data transmission module 151, a program data receiving module 152, a device result data transmission module 153, and a device result data receiving module 154 in cooperation with the communication unit 120. Furthermore, in the edge device 100, the control unit 110 reads a predetermined program to achieve a display module 160, a program setting module 161, a data acquisition module 162, and a calculation module 163 in cooperation with the processing unit 140.

The gateway 200 includes a control unit 210 including a CPU, a RAM, and a ROM; and a communication unit 220 such as a device that is capable to communicate with other devices, in the same way as the suggestion computer 10.

In the gateway 200, the control unit 210 reads a predetermined program to achieve a device detection module 250 and a device data transmission module 251 in cooperation with the communication unit 220.

The computer 300 includes a control unit 310 including a CPU, a RAM, and a ROM; a communication unit 320 such as a device that is capable to communicate with other devices, and a memory unit 330 to store data in the same way as the suggestion computer 10. The computer 300 also includes a processing unit 340 provided with various devices to execute various programs.

In the computer 300, the control unit 310 reads a predetermined program to achieve a program data receiving module 350, a device result data receiving module 351, and a calculation result data transmission module 352 in cooperation with the communication unit 320. Furthermore, in the computer 300, the control unit 310 reads a predetermined program to achieve a memory module 360 in cooperation with the memory unit 330. Still furthermore, in the computer 300, the control unit 310 reads a predetermined program to achieve a calculation module 370 in cooperation with the processing unit 340.

Device Detection Process

Figure 4:
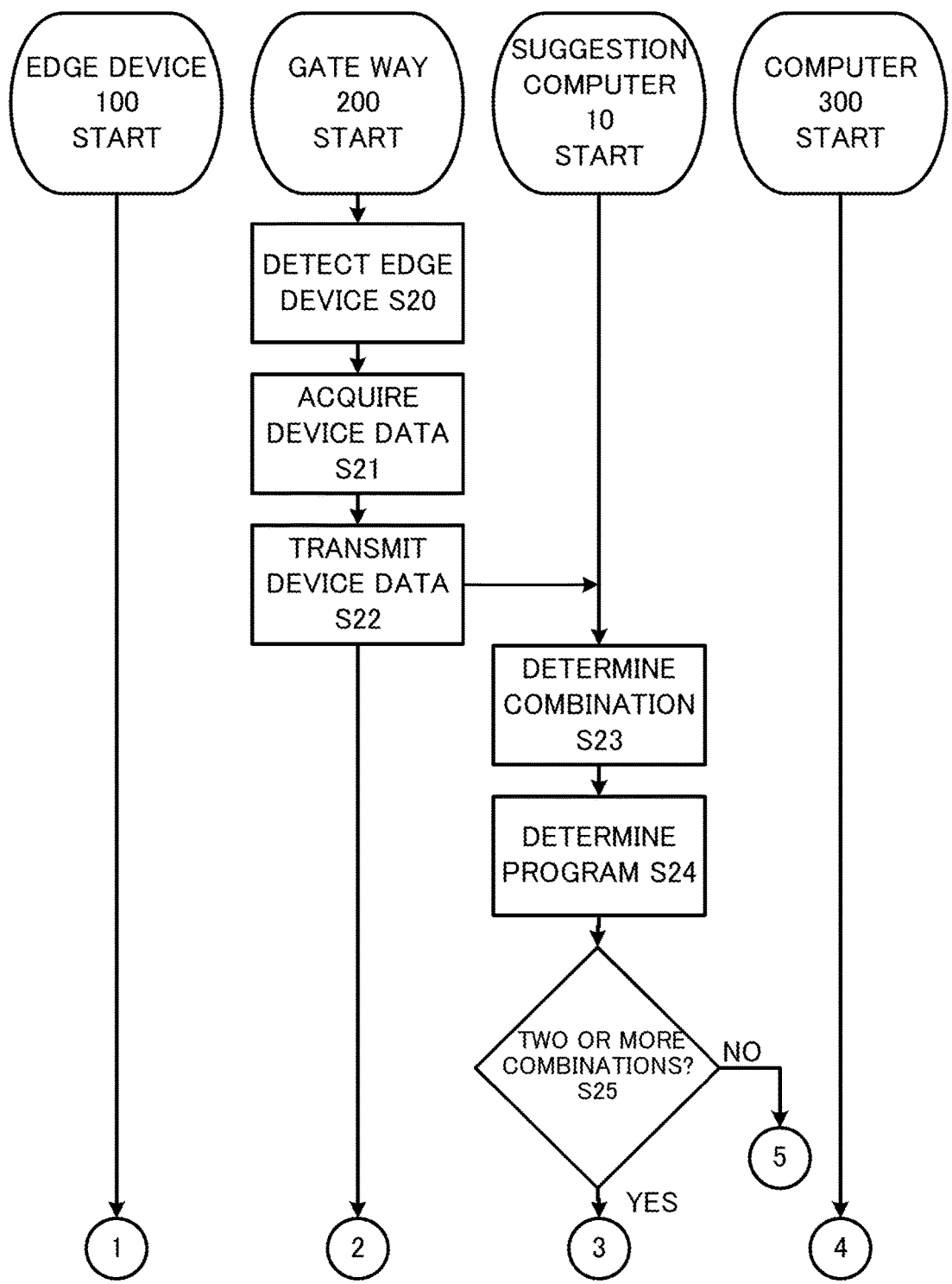
FIG. 4 shows a flow chart to illustrate the device detection process that the suggestion computer 10, the edge device 100, the gateway 200, and the computer 300 perform.
Figure 5:
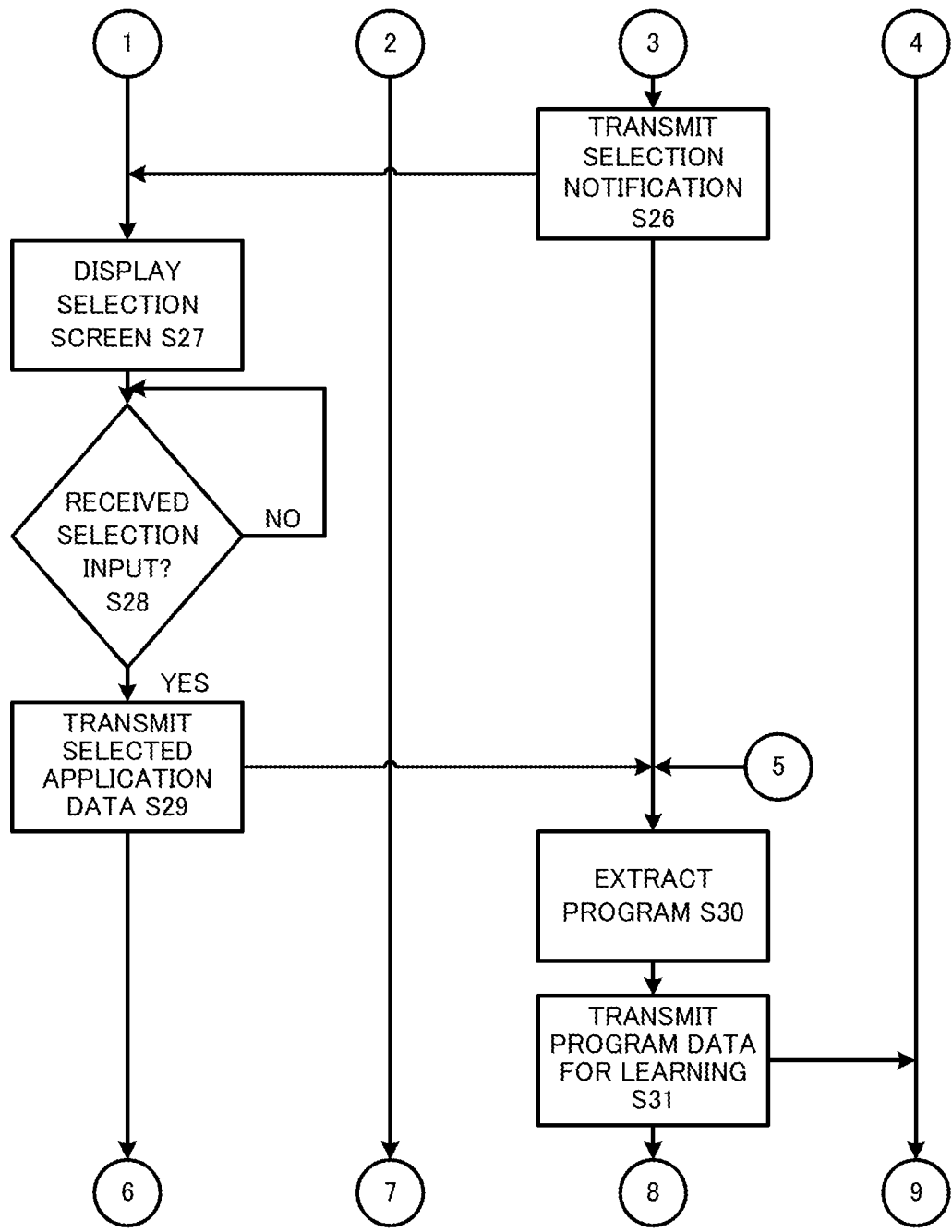
FIG. 5 shows a flow chart to illustrate the device detection process that the suggestion computer 10, the edge device 100, the gateway 200, and the computer 300 perform.
Figure 6:
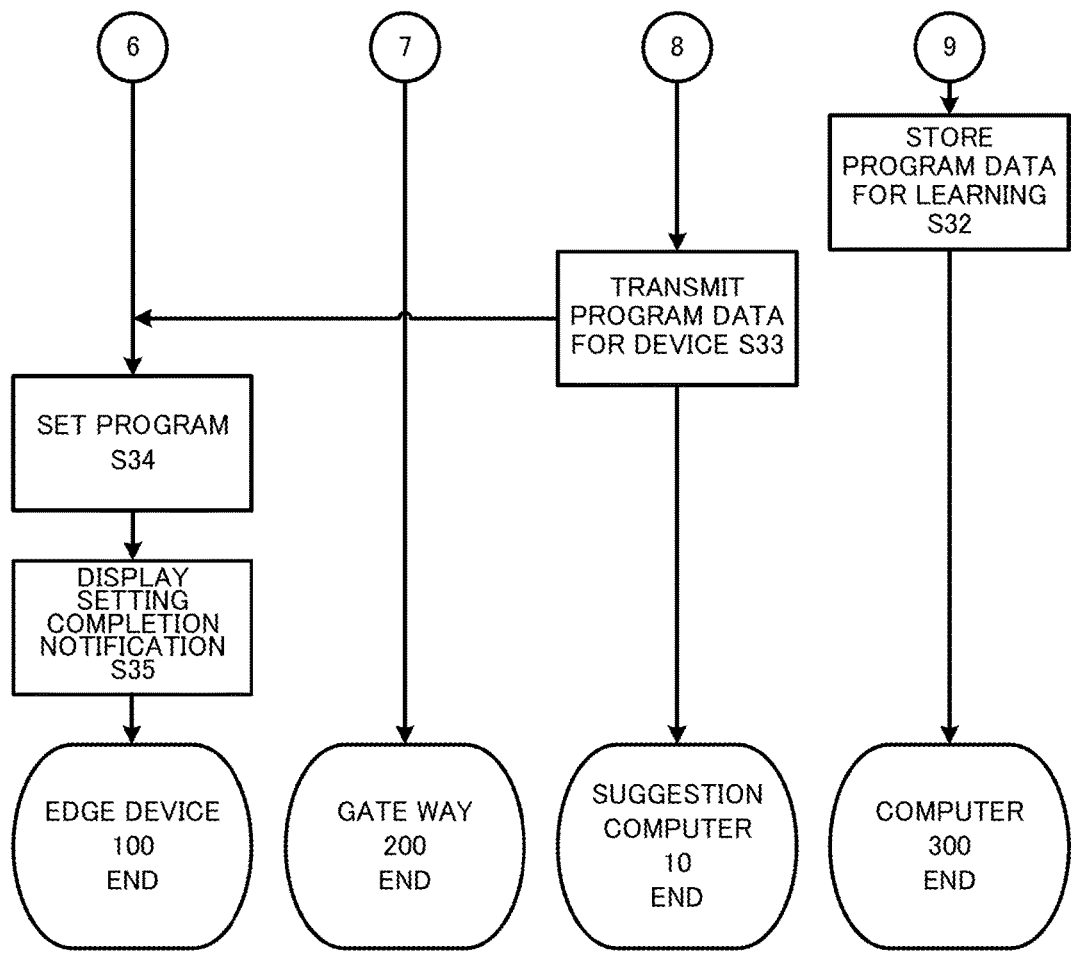
FIG. 6 shows a flow chart to illustrate the device detection process that the suggestion computer 10, the edge device 100, the gateway 200, and the computer 300 perform.

The device detection process performed by the system for controlling an edge device 1 will be described below with reference to FIGS. 4 to 6. FIGS. 4 to 6 show a flow chart to illustrate the device detection process that the suggestion computer 10, the edge device 100, the gateway 200, and the computer 300 perform. The tasks executed by the modules of each of the above-mentioned devices will be explained below together with this process.

The device detection module 250 detects an edge device 100 connected with the gateway 200 itself (Step S20). In the step S20, the device detection module 250 detects an edge device 100 connected with LAN. The device detection module 250 detects a network camera 100a, a sensor device 100b, a mobile terminal 100c, a computer device 100d, and a drone 100e as edge devices 100.

The device detection module 250 acquires device data on the detected edge device 100 (Step S21). In the step S21, the device detection module 250 acquires the unique identifier and the performance of the edge device 100 as device data. The unique identifier of an edge device 100 includes a device name, a production number, a device number, an IP address, and a MAC address. The performance includes the number of instructions processable per unit time and the speed at which various processes are performed. The device detection module 250 may acquire device data from the detected edge device 100 or may acquire necessary data from a computer, a database, etc., in the manufacturer or distributor of this edge device 100 based on the device name, the production number, and the device number that are acquired from the edge device 100.

The device data transmission module 251 transmits the acquired device data to the suggestion computer 10 (Step S22).

The device data receiving module 20 receives the device data. The combination determination module 21 determines the combination of edge devices 100 based on the combination database previously stored in the memory module 30 (Step S23). In the step S23, the combination determination module 21 determines the combination type of edge devices 100 included in the received device data by referring to the combination database.

Combination Database

The combination database that the memory module 30 stores will be described below with reference to FIG. 9. FIG. 9 shows one example of the combination database. The memory module 30 associates and stores a combination type with two or more edge devices 100. The type name is the name of a combination type. The device name is the identifier of an edge device 100. The memory module 30 stores "Type 1," "Type 2," etc., as type names. The memory module 30 stores "TOT-SE01 (temperature sensor for tomatoes), CAM01 (camera), PH06 (smart phone)," "BB-01 (sensor kit for a plastic greenhouse), WEBCAM25 (camera), GAL (tablet)," etc., as device names. The suggestion computer 10 previously acquires and stores this combination database from the edge device 100, other terminal devices, external computers, etc.

The number of edge devices 100 included in the device name is one or more, which can be appropriately changed. The type name is not limited to the names shown in FIG. 9, which can be appropriately changed. All the combination types may not be classified in one database. Each combination type may have one database. In other words, the number of combination types may be equal to that of databases.

In the step S23, the combination determination module 21 determines a combination type by identifying the type name that corresponds to the edge device 100 included in the received device data to determine the combination of edge devices 100. In this example, since the edge devices 100 are a network camera 100a, a sensor device 100b, a mobile terminal 100c, a computer device 100d, and a drone 100e, the type 1 and the type 2 are determined as the combination types corresponding to this edge device 100.

The program determination module 22 determines a program for an edge device 100 and a program for machine learning based on the determined combination (Step S24). In the step S24, the program determination module 22 determines a program for an edge device 100 and a program for machine learning by referring to the program database.

Program Database

The program database that the memory module 30 stores will be described below with reference to FIG. 10. FIG. 10 shows one example of the program database. The memory module 30 associates and stores a type name with a machine learning data set. The type name is the name of the above-mentioned combination type. The machine learning data set includes the name of a targeted application, the name of a program for an edge device 100, and the name of a program for machine learning. The memory module 30 stores "Type 1," "Type 2," etc., as type names. The memory module 30 stores "Application for tomato cultivation, Program set F for an edge device, Machine learning program B for a computer," "Application for cucumber cultivation, Program set V for an edge device, Machine learning program D for a computer," etc., as machine learning data sets. The name of each program is associated with a program necessary to perform a process. The suggestion computer 10 previously acquires and stores this program database from the edge device 100, other terminal devices, external computers, etc.

The type name is not limited to the names shown in FIG. 10, which can be appropriately changed. The name of an application, the name of a program for an edge device 100, and the name of a program for machine learning are not limited to the names shown in FIG. 10, which can be appropriately changed. All the machine learning data sets may not be classified in one database. Each machine learning data set may have one database. In other words, the number of machine learning data sets may be equal to that of databases.

In the step S24, the program determination module 22 determines a machine learning data set by extracting the machine learning data set associated with the determined combination type to determine the name of a targeted application, the name of a program for an edge device 100, and the name of a program for machine learning that are included in this machine learning data set.

The program determination module 22 judges whether or not two or more determined combination types exist (Step S25). If the program determination module 22 judges that two or more determined combination types exist (YES) in the step S25, the selection notification transmission module 23 transmits a selection notification to an edge device 100 that is capable to transmit some information to and receive some input from the users of the display unit, the input units, etc., of the mobile terminal 100c, the computer device 100d, etc., (Step S26). In the step S26, the suggestion computer 10 transmits a selection notification to the gateway 200, and the gateway 200 forwards this selection notification to the edge device 100.

The selection notification receiving module 150 receives the selection notification. The display module 160 displays a selection screen based on the received selection notification (Step S27).

Figure 11:
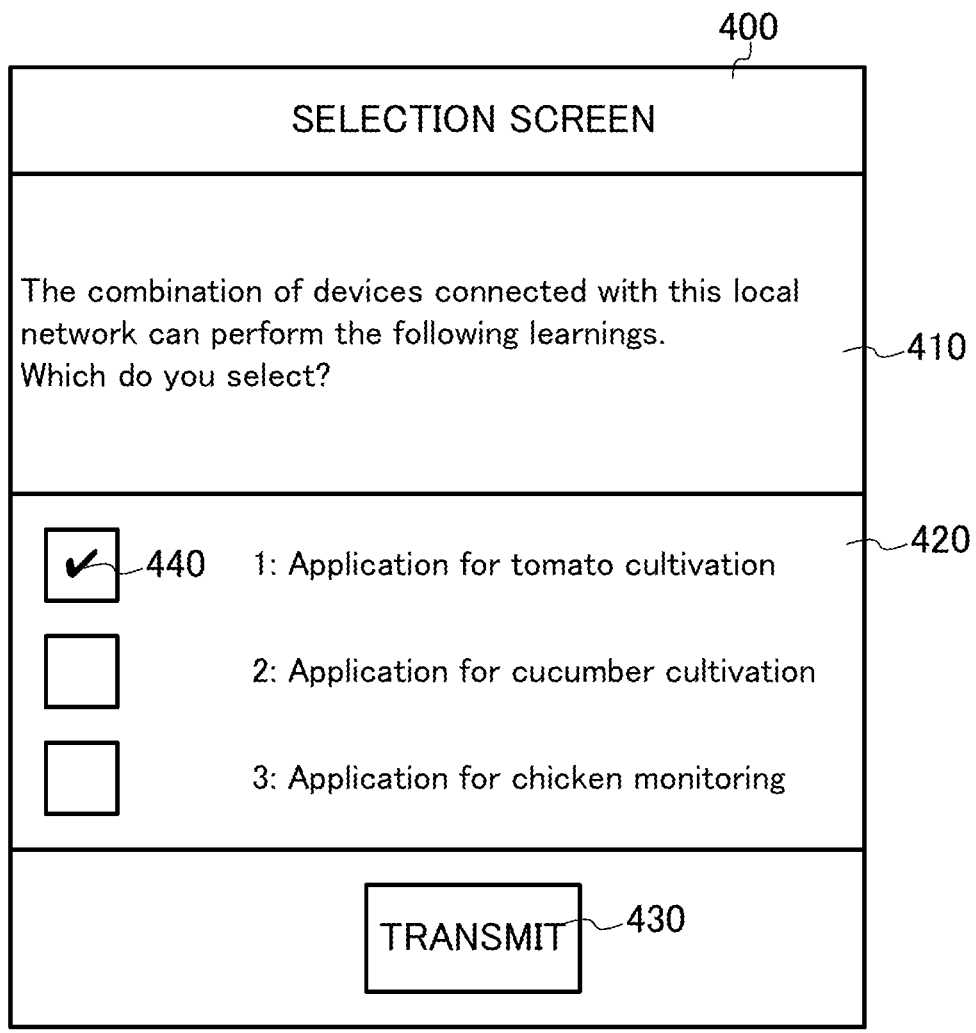
FIG. 11 shows one example of the selection screen 400.

The selection screen that the display module 160 displays will be described below with reference to FIG. 11. FIG. 11 shows one example of the selection screen. The display module 160 displays a description display area 410, an application selection area 420, and a transmission icon 430 in the selection screen 400. The description display area 410 is to notify that this screen is to select an application. The display module 160 displays "The combination of devices connected with this local network can perform the following learnings. Which do you select?" The application selection area 420 is to display all the above-mentioned combination types. The display module 160 displays "1: Application for tomato cultivation," "2: Application for cucumber cultivation," and "3: Application for chicken monitoring." The application selection area 420 receives one selected application through input from the user. The display module 160 displays a selection icon 440 for a selected application received through input. The display module 160 displays a check mark as the selection icon 440. The transmission icon 430 causes the selected application data transmission module 151 to transmit the selected application as selected application data to the suggestion computer 10 by receiving input from the user.

The content, the form, the location, the order, etc., of the display areas and the icons that are mentioned above can be appropriately changed. The application selection area 420 may receive selection for two or more applications.

The display module 160 judges whether or not the display module 160 has received selection input (Step S28). In the step S28, the display module 160 judges whether or not the display module 160 has received selection input for an application and input from the transmission icon 430. If judging that the display module 160 has not received selection input (NO) in the step S28, specifically, if the display module 160 has not received selection input for an application or if the display module 160 has received selection input for an application but not received input from the transmission icon 430, the display module 160 repeats this step until receiving selection input for an application and input from the transmission icon 430.

On the other hand, if judging that the display module 160 has received selection input (YES) in the step S28, specifically, if the display module 160 has received selection input for an application and input from the transmission icon 430, the selected application data transmission module 151 transmits the selected application data that indicates an application selected through selection input to the suggestion computer 10 (Step S29). In the step S29, the edge device 100 transmits the selected application data to the gateway 200, and the gateway 200 forwards this selected application data to the suggestion computer 10.

The selected application data receiving module 24 receives the selected application data.

If the program determination module 22 judges that two or more determined combination types do not exist (NO) in the step S25 or if the selected application data receiving module 24 receives selected application data, the program determination module 22 extracts a program for an edge device 100 and a program for machine learning that are included in the machine learning data set associated with this determined one combination type or one combination type associated with the application data selected through selection input from an edge device 100 (Step S30). In the step S30, the program determination module 22 extracts program data associated with the name of the program for an edge device 100 and program data associated with the name of the program for machine learning.

The program data transmission module 25 transmits program data for learning that indicates a program for machine learning to the computer 300 (Step S31).

The program data receiving module 350 receives the program data for learning. The memory module 360 stores the received program data for learning (Step S32).

The program data transmission module 25 transmits program data for a device that indicates a program for an edge device 100 to an edge device 100 (Step S33). In the step S33, the suggestion computer 10 transmits program data for a device to a gateway 200, and the gateway 200 forwards the program data for a device to the edge devices 100 corresponding to the program data for a device.

The program data receiving module 152 receives the program data for a device. The program setting module 161 sets the program for an edge device 100 based on the received program data for a device (Step S34). In the step S34, the program is set for each edge device 100. Specifically, in this embodiment, the network camera 100a, the sensor device 100b, and the mobile terminal 100c each set the corresponding program.

The display module 160 displays a setting completion notification that indicates that the program has been set (Step S35). In the step S35, if the program has been set in an edge device 100 that is capable to transmit some information to and receive some input from the above-mentioned users, the above-mentioned setting completion notification is displayed on this edge device 100. If the program has not been set in such an edge device 100, the suggestion computer 10 displays the setting completion notification on this edge device 100 connected with the gateway 200.

Figure 12:
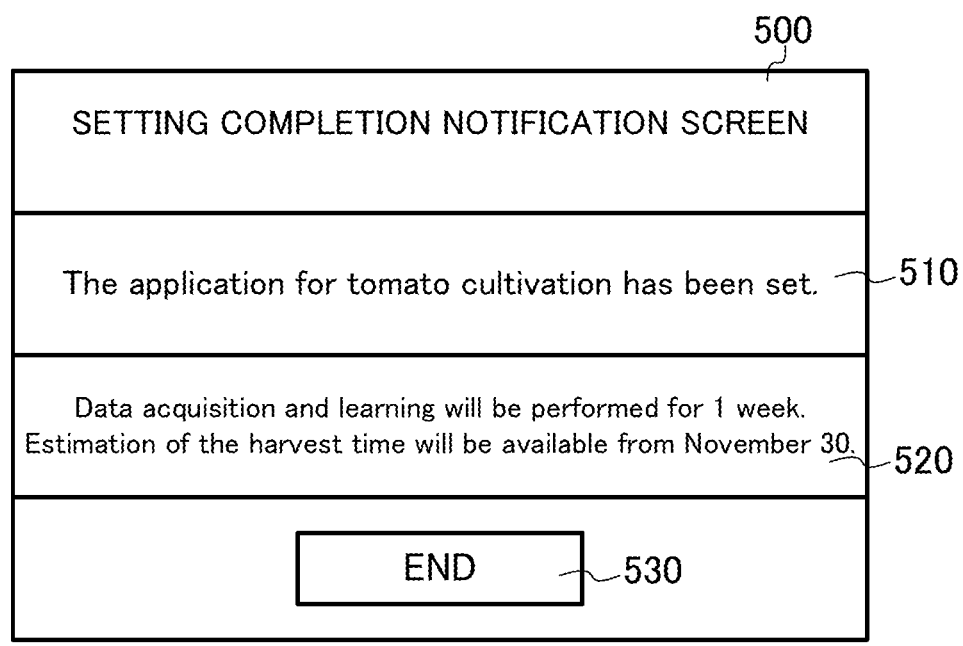
FIG. 12 shows one example of the setting completion notification screen 500.

The setting completion notification that the display module 160 displays will be described below with reference to FIG. 12. FIG. 12 shows one example of the setting completion notification. The display module 160 displays a set content notification area 510, a learning content notification area 520, and an end icon 530 in the setting completion notification screen 500. The set content notification area 510 is to notify the content concerning the set program. In this example, the display module 160 displays "The application for tomato cultivation has been set. The learning content notification area 520 is to notify the content concerning learning and program execution. In this example, the display module 160 displays "Data acquisition and learning will be performed for 1 week. Estimation of the harvest time will be available from November 30." The end icon 530 ends the display of the setting completion notification screen by receiving input from the user.

The content, the form, the location, the order, etc., of the display areas and the icons in the setting completion notification screen 500 can be appropriately changed.

First Machine Learning Process

Figure 7:
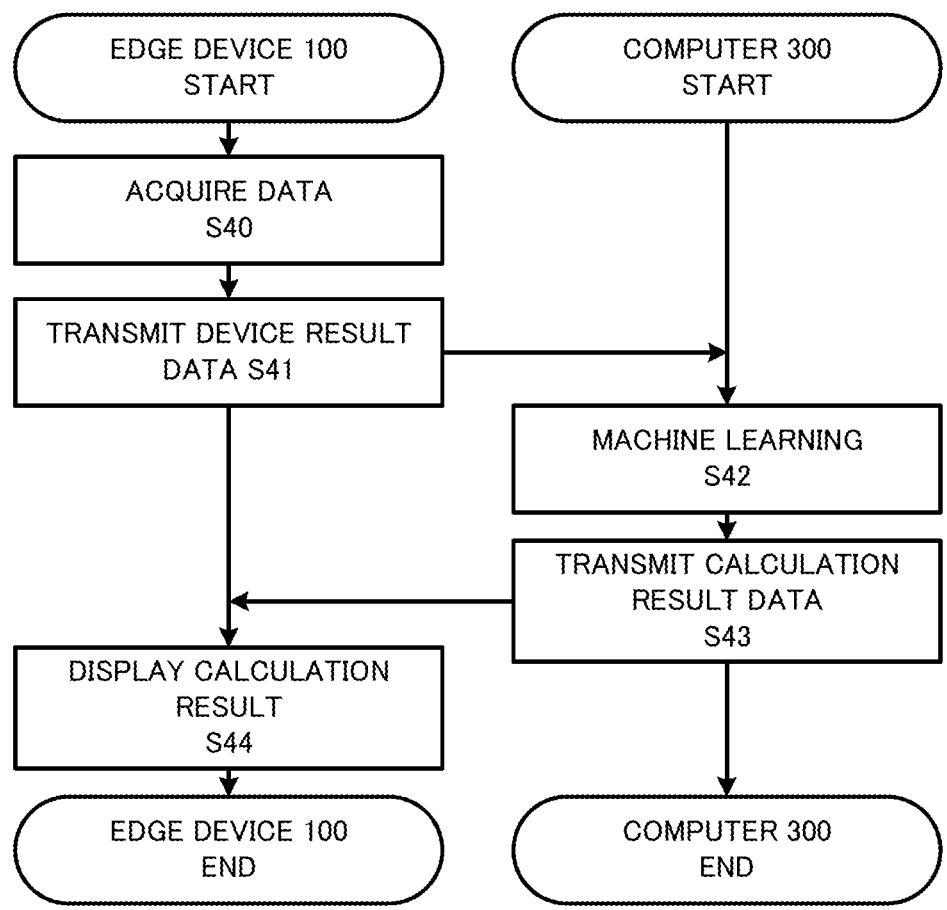
FIG. 7 shows a flow chart to illustrate the first machine learning process that the edge device 100 and the computer 300 perform.

The first machine learning process performed by the system for controlling an edge device 1 will be described below with reference to FIG. 7. FIG. 7 shows a flow chart to illustrate the first machine learning process that the edge device 100 and the computer 300 perform. The tasks executed by the modules of each of the above-mentioned devices will be explained below together with this process.

The data acquisition module 162 acquires various data (Step S40). In the step S40, the data acquisition module 162 acquires various data based on a program for an edge device 100. If the data acquisition module 162 is a network camera 100a, image data are acquired by taking an image. If a sensor device, environmental data are acquired.

The device result data transmission module 153 transmits the acquired various data to the computer 300 as device result data (Step S41). In the step S41, the edge device 100 transmits device result data to a gateway 200, and the gateway 200 forwards the device result data to the computer 300.

The device result data receiving module 351 receives the device result data. The calculation module 370 performs machine learning by executing the stored program for machine learning based on the received device result data (Step S42).

The calculation result data transmission module 352 transmits calculation result data that is the result of machine learning to an edge device 100 (Step S43). In the step S43, the calculation result data transmission module 352 transmits calculation result data to an edge device 100 that is capable to transmit some information to and receive some input from the above-mentioned users. Specifically, the calculation result data are transmitted to a mobile terminal 100c or a personal computer 100d. The computer 300 transmits calculation result data to a gateway 200, and the gateway 200 forwards the calculation result data to an edge device 100.

The display module 160 displays the calculation result based on the calculation result data (Step S44).

Second Machine Learning Process

Figure 8:
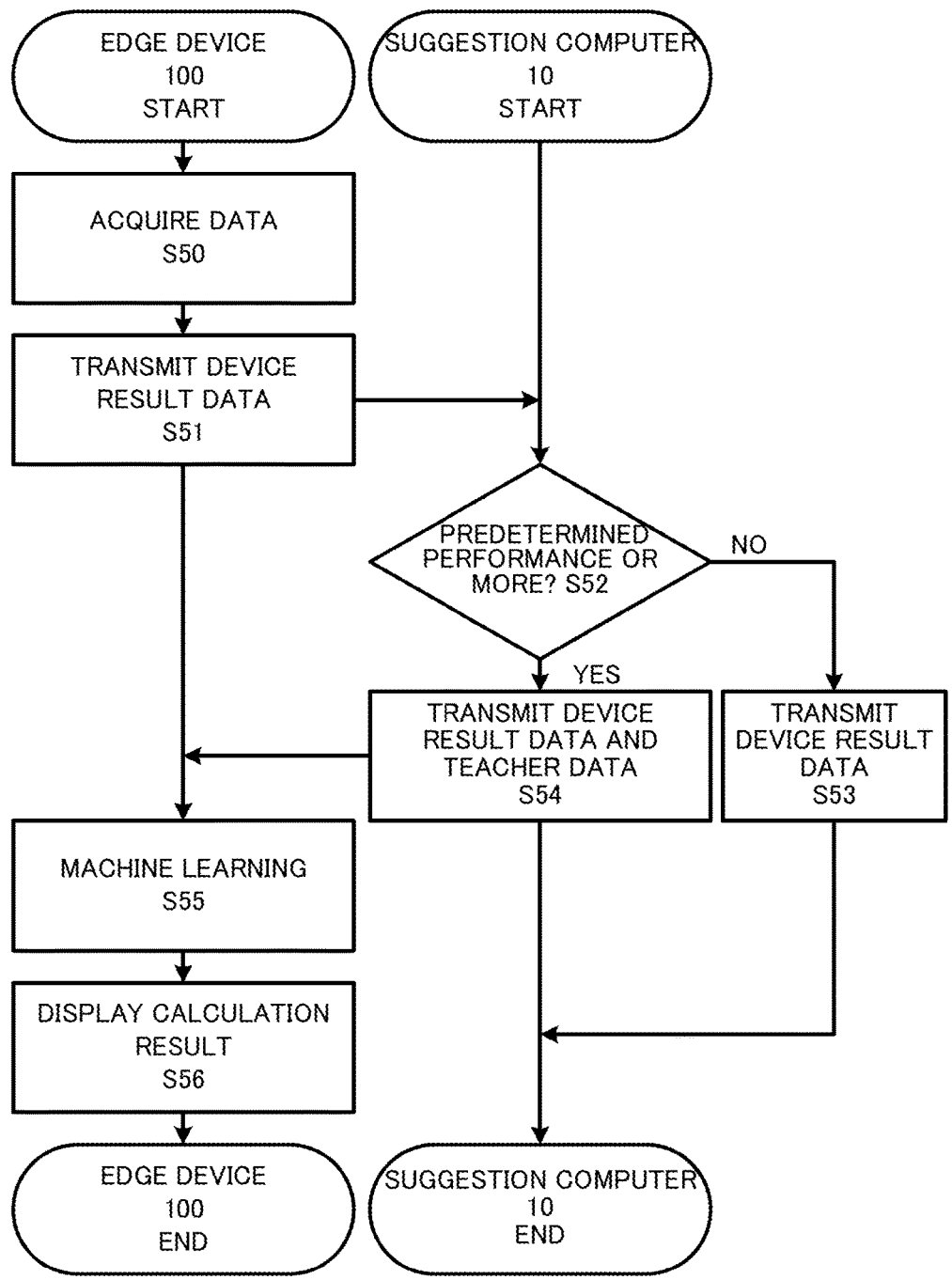
FIG. 8 shows a flow chart to illustrate the second machine learning process that the suggestion computer 10 and the edge device 100 perform.

The second machine learning process performed by the system for controlling an edge device 1 will be described below with reference to FIG. 8. FIG. 8 shows a flow chart to illustrate the second machine learning process that the suggestion computer 10, the edge device 100, and the computer 300 perform. The tasks executed by the modules of each of the above-mentioned devices will be explained below together with this process.

The data acquisition module 162 acquires various data (Step S50). The step S50 is processed in the same way as the above-mentioned step S40.

The device result data transmission module 153 transmits device result data to the suggestion computer 10 (Step S51).

The device result data receiving module 27 receives the device result data. The performance judgment module 26 judges whether or not the performance of an edge device 100 connected with a gateway 200 is a predetermined performance or more (Step S52). In the step S52, the performance judgment module 26 judges the performance based on the above-mentioned device data. The predetermined performance is enough for machine learning. The performance may be judged separately at two or more levels to cause the process to be described later to perform according to the judged performance. For example, the process to be described later is performed in an edge device 100 with a performance of the first level, a part of the process to be described later is performed in an edge device 100 with a performance of the second level, and a smaller part of the process to be described later is performed in an edge device 100 with a performance of the third level.

If the performance judgment module 26 judges that the performance is not a predetermined performance or more (NO) in the step S52, the device result data transmission module 28 transmits the device result data to the computer 300 (Step S53) and ends this process. The system for controlling an edge device 1 only has to perform the above-mentioned first machine learning process for the device result data.

On the other hand, if the performance judgment module 26 judges that the performance is a predetermined performance or more (YES) in the step S52, the device result data transmission module 28 transmits the device result data and teacher data corresponding to the device result data to the edge device 100 (Step S54). In the step S54, the device result data transmission module 28 may transmit teacher data acquired from the computer 300 and other computers or previously stored teacher data. The device result data transmission module 28 also transmits program data for learning together with teacher data.

The device result data receiving module 154 receives the device result data and the teacher data. The device result data receiving module 154 may download teacher data directly from computers other than the suggestion computer 10. Accordingly, the system for controlling an edge device 1 controls the edge device 100 to download teacher data corresponding to the device result data.

The calculation module 163 performs machine learning based on the device result data and the teacher data (Step S55). In the step S55, the calculation module 163 performs machine learning by executing the program for machine learning based on the device result data, the teacher data, and the program data for learning.

The display module 160 displays the calculation result based on the calculation result data as the result of machine learning (Step S56). In the step S56, the edge device 100 may transmit the calculation result data to another edge device 100 to cause this edge device 100 to display the calculation result based on the calculation result data.

To achieve the means and the functions that are described above, a computer (including a CPU, an information processor, and various terminals) reads and executes a predetermined program. For example, the program may be provided through Software as a Service (SaaS), specifically, from a computer through a network or may be provided in the form recorded in a computer-readable medium such as a flexible disk, CD (e.g., CD-ROM), or DVD (e.g., DVD-ROM, DVD-RAM). In this case, a computer reads a program from the record medium, forwards and stores the program to and in an internal or an external storage, and executes it. The program may be previously recorded in, for example, a storage (record medium) such as a magnetic disk, an optical disk, or a magnetic optical disk and provided from the storage to a computer through a communication line.

The embodiments of the present invention are described above. However, the present invention is not limited to the above-mentioned embodiments. The effect described in the embodiments of the present invention is only the most preferable effect produced from the present invention. The effects of the present invention are not limited to those described in the embodiments of the present invention.

REFERENCE SIGNS LIST

1 System for controlling an edge device
10 Suggestion computer
100 Edge device
200 Gateway
300 Computer

What is claimed is:

1. A computer system, comprising:
a communication device; and
a processor that:
  acquires device data on edge devices connected with a gateway via the communication device;
  determines a type corresponding to a combination of the edge devices from among a plurality of types, based on the acquired device data;
  determines a first program for the edge devices based on the determined type;
  transmits, via the communication device, data on the first program to the edge devices to execute the first program;
  receives, via the communication device, device result data from each of the edge devices, the device result data being data which is acquired by each of the edge devices based on the first program; and
  transmits, via the communication device, teacher data corresponding to the device result data to a first edge device whose performance meets or exceeds a predetermined performance among the edge devices, thereby causing the first edge device to perform machine learning for the device result data by using the teacher data.

2. The computer system according to claim 1, wherein the processor:
  determines a second program for machine learning based on the determined type; and
  transmits data on the second program to the first edge device when transmitting the teacher data to the first edge device.

3. The computer system according to claim 1, wherein the processor:
  determines a second program for machine learning based on the determined type;
  transmits, via the communication device, data on the second program to a predetermined computer to execute the second program; and
  when a second edge device among the edge devices is less than the predetermined performance, transmits the device result data of the second edge device and the teacher data corresponding to the device result data to the predetermined computer, thereby causing the predetermined computer to perform machine learning for the device result data by using the teacher data.

4. A method executed by a computer system, comprising:
acquiring device data on edge devices connected with a gateway;
determining a type corresponding to a combination of the edge devices from among a plurality of types, based on the acquired device data;
determining a first program for the edge devices based on the determined type;
transmitting data on the first program to the edge devices to execute the first program;
receiving device result data from each of the edge devices, the device result data being data which is acquired by each of the edge devices based on the first program; and
transmitting teacher data corresponding to the device result data to a first edge device whose performance meets or exceeds a predetermined performance among the edge devices, thereby causing the first edge device to perform machine learning for the device result data by using the teacher data.

5. The method according to claim 4, further comprising:
determining a second program for machine learning based on the determined type; and
transmitting data on the second program to the first edge device when transmitting the teacher data to the first edge device.

6. The method according to claim 4, further comprising:
determining a second program for machine learning based on the determined type;
transmitting data on the second program to a predetermined computer to execute the second program; and
when a second edge device among the edge devices is less than the predetermined performance, transmitting the device result data of the second edge device and the teacher data corresponding to the device result data to the predetermined computer, thereby causing the predetermined computer to perform machine learning for the device result data by using the teacher data.

7. A non-transitory computer-readable recording medium having a set of instructions for causing a computer system to execute:
acquiring device data on edge devices connected with a gateway;
determining a type corresponding to a combination of the edge devices from among a plurality of types, based on the acquired device data;

determining a first program for the edge devices based on the determined type;

transmitting data on the first program to the edge devices to execute the first program;

receiving device result data from each of the edge devices, the device result data being data which is acquired by each of the edge devices based on the first program; and transmitting teacher data corresponding to the device result data to a first edge device whose performance meets or exceeds a predetermined performance among the edge devices, thereby causing the first edge device to perform machine learning for the device result data by using the teacher data.

8. The non-transitory computer-readable recording medium according to claim 7, wherein the set of instructions causes the computer system to further execute:

determining a second program for machine learning based on the determined type; and transmitting data on the second program to the first edge device when transmitting the teacher data to the first edge device.

9. The non-transitory computer-readable recording medium according to claim 7, wherein the set of instructions causes the computer system to further execute:

determining a second program for machine learning based on the determined type;

transmitting data on the second program to a predetermined computer to execute the second program; and when a second edge device among the edge devices is less than the predetermined performance, transmitting the device result data of the second edge device and the teacher data corresponding to the device result data to the predetermined computer, thereby causing the predetermined computer to perform machine learning for the device result data by using the teacher data.

* * * * *